United States Patent [19]

Gilmore

[11] Patent Number: 4,480,494
[45] Date of Patent: Nov. 6, 1984

[54] DEVICE TO TRANSLATE OSCILLATORY MOTION INTO RECIPROCATING MOTION

[75] Inventor: William J. Gilmore, Manitou Beach, Mich.

[73] Assignee: Acco Babcock Inc., Fairfield, Conn.

[21] Appl. No.: 450,723

[22] Filed: Dec. 17, 1982

[51] Int. Cl.$^3$ ............................................. B60K 20/06
[52] U.S. Cl. ................................. 74/473 SW; 74/487; 74/501 R
[58] Field of Search ................. 74/473 SW, 487, 99 R, 74/102, 103, 89.2, 82, 501 R, 108; 116/28.1, DIG. 20

[56] References Cited

U.S. PATENT DOCUMENTS

| 1,146,322 | 7/1915 | Frey | 74/487 |
|---|---|---|---|
| 1,426,686 | 8/1922 | Troup | 74/487 |
| 3,258,989 | 7/1966 | Frese et al. | 74/501 |
| 3,298,243 | 1/1967 | Geissler et al. | 74/501 R |
| 3,444,701 | 5/1969 | Randolph | 74/501 R |
| 3,600,966 | 8/1971 | Anderson | 74/473 SW |
| 3,605,520 | 9/1971 | Lorenz et al. | 74/473 |
| 3,766,801 | 10/1973 | Wiegand | 74/480 B |
| 3,771,384 | 11/1973 | Hackman | 74/501 R X |
| 4,261,282 | 4/1981 | Satou et al. | 74/473 SW X |
| 4,292,859 | 10/1981 | Teraura | 74/501 R |

FOREIGN PATENT DOCUMENTS

| 1033063 | 6/1958 | Fed. Rep. of Germany | 74/487 |
|---|---|---|---|
| 2443637 | 3/1976 | Fed. Rep. of Germany | 74/473 SW |

*Primary Examiner*—Leslie A. Braun
*Assistant Examiner*—Dwight G. Diehl
*Attorney, Agent, or Firm*—Pennie & Edmonds

[57] ABSTRACT

A device to translate oscillatory motion into reciprocal motion where the device includes a rigid tubular guide conduit connected to a flexible conduit. The rigid guide conduit includes a first arcuate portion having a keyhole slot extending through a side wall of the rigid conduit. The arcuate portion of the guide conduit is connected to a second straight portion which extends perpendicular to the plane of the arcuate portion and is connected to the arcuate portion by a curved portion. A core is movable within the rigid and flexible conduits and is connected to a tab extending through the slot.

5 Claims, 5 Drawing Figures

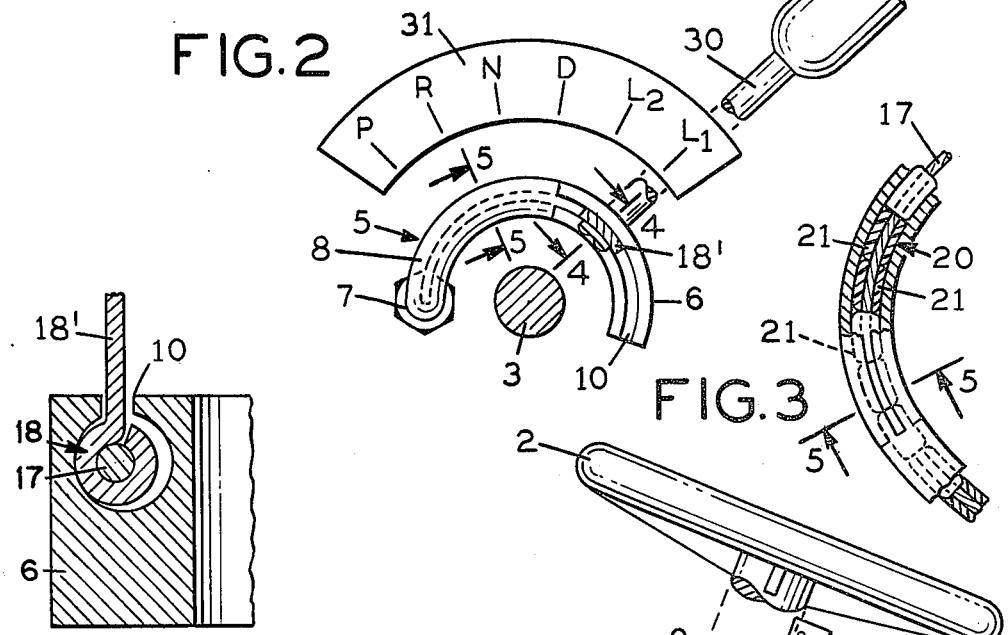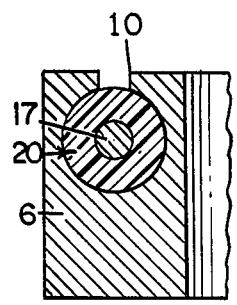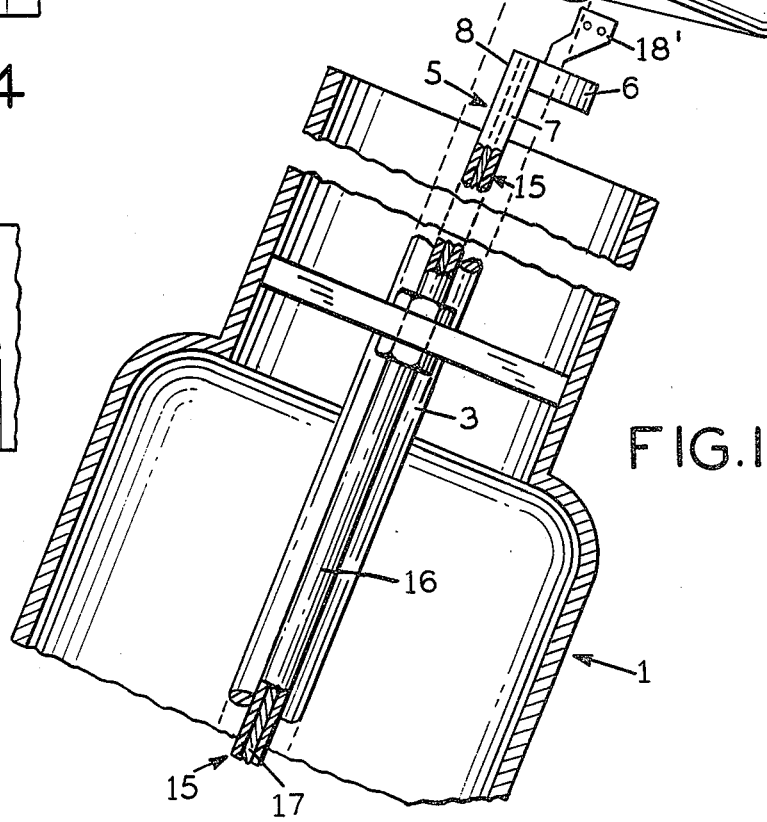

DEVICE TO TRANSLATE OSCILLATORY MOTION INTO RECIPROCATING MOTION

FIELD OF THE INVENTION

This invention relates to a device to translate oscillating motion into reciprocating motion. More particularly the invention relates to a gear shift mechanism for an automobile wherein the gear shift lever on a steering column is connected by a flexible core to an automatic transmission and wherein oscillatory or arcuate movement of the gear shift lever will cause the core to move in a straight line movement to actuate the automatic transmission.

BACKGROUND OF THE INVENTION

Conventional steering column gear shift levers are mechanically linked to a lever arm at the bottom of the steering column of an automobile. Because it is necessary for safety purposes to design the steering column to collapse in the event it is impacted in an accident, it is necessary that relatively expensive telescopic shear means be utilized in the gear shift linkage to accommodate a collapse of the steering column. Further the use of such linkages requires use of rods, lever arms and bell cranks resulting in considerable weight and in considerable expense involved in forming the various parts and in assembling the parts.

It is therefore an object of my invention to provide for a device to translate rotary motion into reciprocating movement and which may be adapted for use as a gear shift mechanism to eliminate use of costly and complicated linkage systems while at the same time providing for a mechanism that may collapse under impact loads.

GENERAL DESCRIPTION OF THE INVENTION

Broadly a device constructed according to my invention comprises a rigid tubular guide conduit including a first arcuate portion having a keyhole slot extending through a side wall of the conduit, a second straight portion which extends substantially perpendicular to the plane of the first portion and a third curved portion which joins the first arcuate portion and the second straight portion. A flexible tubular conduit is connected to an end of the second straight portion of the rigid guide conduit opposite the curved portion. A flexible core member, preferably an armored strand, extends through the guide conduit and flexible conduit and has a tab extension on one end which extends through the keyhole slot. Arcuate movement of the tab extension in the keyhole slot will cause the core to move in the straight portion of the rigid conduit and in the flexible conduit and thus covert oscillatory motion to reciprocating motion.

Preferably the core member has a flexible sheath engaging its outer periphery adjacent the tab extension and which also engages the inner periphery of the rigid guide conduit. This construction provides a tight fit between the outer periphery of the core member and the inner periphery of the rigid conduit and so prevents any lost motion occurring between the two upon movement of the core member relative to the rigid guide conduit. The length of the flexible sheath is substantially equal to the length of the first arcuate portion and the third curved joining portion.

The tab extension is adapted to have a gear shift lever connected thereto and the flexible conduit is adapted to be secured to and to extend parallel to a steering column. The end of the flexible core member opposite the tab extension may be connected to an automatic transmission.

Such construction eliminates the use of complicated linkage systems while at the same time provides flexibility in the event the steering column collapses under impact loads since the core and conduit are both flexible.

BRIEF DESCRIPTION OF THE DRAWINGS

FIG. 1 is a side sectional view of a steering column of an automobile to which a device constructed according to the invention is applied;

FIG. 2 is an enlarged partial sectional plan view of a device constructed according to the invention as applied to an automatic gear shift control of an automobile;

FIG. 3 is a partial sectional view of the device of FIG. 2;

FIG. 4 is an enlarged sectional view of FIG. 2 taken along lines 4—4; and

FIG. 5 is an enlarged sectional view of FIG. 2 taken along lines 5—5.

DETAILED DESCRIPTION OF THE INVENTION

Referring to FIGS. 1 and 2, there is illustrated a steering column 1 of an automobile including a steering wheel 2 and a steering shaft 3. A device for translating oscillatory motion into a reciprocating motion is mounted on the steering column and forms a part of the automatic transmission control of the automobile.

As shown the device comprises a rigid tubular guide conduit 5 having a first arcuate portion 6, a straight portion 7 which extends substantially perpendicular to the plane of the arcuate portion 6 and a third curved portion 8 which joins or connects the portions 6 and 7. With reference to FIG. 2, the plane of the arcuate portion 6 is coplanar with that of the drawing while the second straight portion 7 extends perpendicular to the plane of the drawing. The third curved portion 8 bends approximately 90° from the plane of the drawing downwardly to connect with the straight portion.

A keyhole slot 10 extends through a side wall of the arcuate portion 6 and circumscribes an arc of approximately 110°.

The rigid guide conduit 5 is connected at its end opposite the keyhole slot to a flexible conduit 15 which has a straight portion 16 extending parallel to and within the steering column 1.

A core member 17 extends through flexible conduit 15 as well as the rigid guide conduit 5 and has a tab 18 connected at one end by crimping or other means. The tab 18 includes an extension 18' which extends through the keyhold slot 10. As seen in FIGS. 1 and 2 movement of the tab in the rigid arcuate portion 6 will cause the core member 17 to move in the arcuate portion 6 as well as in the curved portion 8 and straight portion 7 such that the arcuate or oscillatory motion of the tab 18 about the center of curvature of the arcuate portion will result in linear motion of the core 17 within the straight portion 7 of the rigid guide as well as within the flexible conduit 15.

Preferably the core member 17 has a flexible sheath 20 engaging the inner periphery of the curved portion 8 of the guide conduit, as shown in FIG. 5, and of the arcuate portion 6 when the tab extension is at the end of its rotational travel in the clockwise direction with reference to FIG. 2. Thus the sheath should extend a length equal to that of the combined lengths of the arcuate and curved portions 6 and 8. The sheath may comprise a plurality of individual tubular elements 21 as shown in FIG. 3 to impart flexibility to the sheath or could comprise a single member ribbed or slotted in a radial direction to give flexibility. By this construction any looseness between the core member 17 and the inner periphery of the curved and arcuate portion of the guide conduit caused by spacing between the core and the inner peripheries is prevented thus eliminating any lost motion that might result from such spacing.

The core member 17 is preferably of the armored strand type and is capable of transmitting compression and tension loads.

Referring to FIG. 2 a gear shift lever 30 is shown connected with the tab extension 18' in order to provide the force necessary to move the tab extension within the slot 10. An indicia plate 31 is fixed with respect to the steering column 1 shown in FIG. 1 to provide an indication of the positioning of the gear shift lever to achieve the desired operating mode of an automatic transmission with which the core member 17 connects. An indicator, not shown, is operably connected to the lever 30 to point to one of the selected indicia determined by positioning of the lever.

The device is designed such that movement of the operating lever out of "park" exerts a tension force on the core member 17. A tension force is desired rather than a compression force since the heaviest load that is encountered in operation of an automatic transmission is movement of the gear lever from the "park" position. This feature is purposely designed into automatic transmissions as a safety measure to reduce chance of inadvertent movement of the gear shift lever from the "park" position to an operating position.

It is seen that a device constructed according to the invention eliminates use of complicated linkages and because flexible conduits and cores are used, the parts are light-weight and may easily collapse upon collapse of the steering column.

While the device is illustrated in the drawings as applied to a gear shift mechanism for an automatic transmission, the device could be used in other applications where it is necessary or desirable to translate a oscillatory motion to a linear motion.

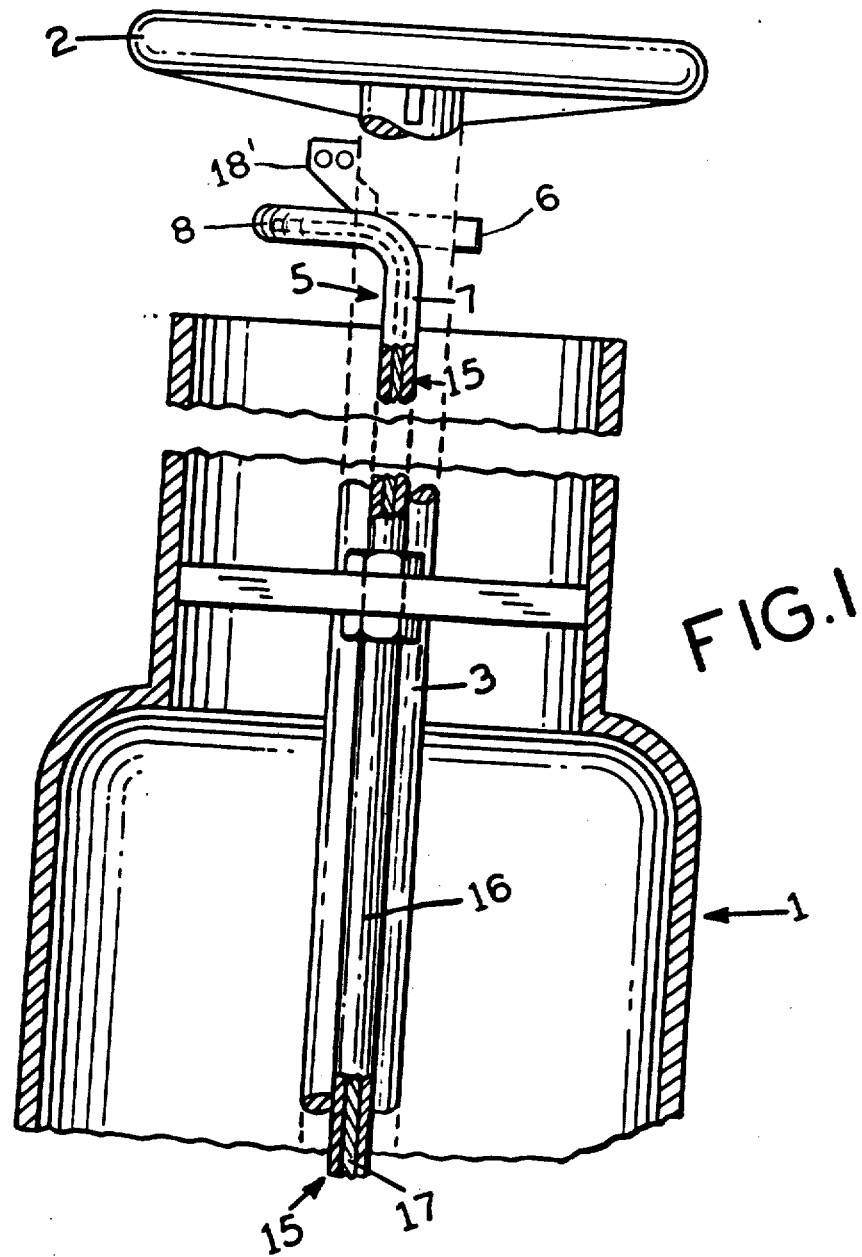

I claim:

1. A device to translate oscillating motion into reciprocating motion comprising a rigid tubular guide conduit having a first arcuate portion including a keyhole slot extending through a side wall of the conduit, a second straight portion extending substantially perpendicular to the plane of the arcuate portion and a third curved portion connecting the first and second portions, a flexible conduit connected at one end of said second portion opposite the curved portion, a flexible core member capable of transmitting tension and compression loads movable in said rigid guide and said flexible conduits, and a tab extension extending through said keyhole slot and being connected to an end of said core member whereby arcuate movement of said tab extension in said keyhole slot transforms a oscillatory motion of the end of the core member connected to said tab extension into a linear motion of the core member in the straight portion and in said flexible conduit.

2. A device according to claim 1 having in addition a flexible sheath engaging the outer periphery of the core member adjacent said tab extension and engaging the inner periphery of said curved portion and said arcuate portion to minimize any lost motion between said core member and said curved guide conduit when said core member is moved in said guide conduit.

3. A device according to claim 2 wherein the arcuate length of said flexible sheath is substantially equal to the length of said arcuate portion and said curved portion to said rigid guide conduit.

4. A device according to claim 2 wherein said flexible sheath comprises a plurality of tubular elements surrounding the core member.

5. A device according to claim 1 having in addition a gear shift lever connected to said tab extension and wherein the flexible conduit is adapted to be secured to and extend parallel to a steering column.

* * * * *

UNITED STATES PATENT AND TRADEMARK OFFICE
CERTIFICATE OF CORRECTION

PATENT NO. : 4,480,494　　　　　　　　　　　　　　　Page 1 of 2

DATED : November 6, 1984

INVENTOR(S) : William J. Gillmore

It is certified that error appears in the above-identified patent and that said Letters Patent is hereby corrected as shown below:

Figure 1 should appear as shown on the attached sheet.

Signed and Sealed this

Twenty-fourth Day of September 1985

[SEAL]

Attest:

DONALD J. QUIGG

Attesting Officer

Commissioner of Patents and Trademarks—Designate